Patented July 7, 1953

2,644,850

UNITED STATES PATENT OFFICE 2,644,850

TREATMENT OF RUBBER

William McGillivray Morgan, Amersham, England, assignor to Monsanto Chemicals Limited, London, England, a British company No Drawing. Application March 6, 1952, Serial No. 275,219. In Great Britain June 21, 1948

14 Claims. (Cl. 260—763)

This invention relates to the processing of rubber, and to new vulcanization retarders.

The use of a vulcanization retarder in the compounding of rubber is common practice in order to reduce the tendency to "scorch," which can be defined as partial and premature vulcanization of the rubber stock taking place during the mixing operation in the course of which the filler, as for example carbon black, and vulcanization accelerator, among other substances, are introduced, or during the shaping operation, extrusion or calendering for instance. The use of vulcanization retarders may, moreover, become of increasing importance with the greater use of the so-called "furnace carbon blacks." In the process of mixing rubber carbon blacks made by the channel process (the so-called channel carbon blacks) are in wide use, especially in the tire industry, and carbon blacks made by the furnace process (known as furnace carbon blacks) are also in considerable use. However, there is a possibility that furnace carbon blacks may become even more widely used than they are at present, and it has been found that when using furnace blacks there is a greater tendency for scorching to take place during compounding. This tendency appears to increase with the fineness of the furnace black.

I have now discovered a new series of vulcanization retarders, particularly useful in rubber stocks containing furnace carbon blacks, but also useful in other instances whether carbon blacks are present or not.

According to the invention there is employed as vulcanization retarder a salt of an aryl sufonic acid with a metal other than an alkali metal or cadmium. While free sulfonic acids exert some retarding action they are corrosive to equipment and dangerous to handle. Furthermore, it has now been found that the salt of sulfonic acids actually are superior to the acids themselves. Zinc salts are especially effective. The optimum activity has been observed with zinc salts of aryl sulfonic acids substituted in the nucleus by a long chain alkyl group as for example a hexyl, octyl, nonyl, decyl or dodecyl group. The zinc salt of dodecyl benzene sulfonic acid is particularly valuable. However there are many others and examples are given below:

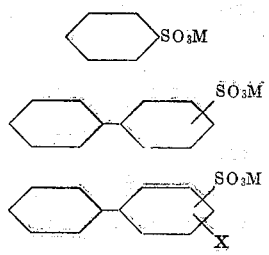

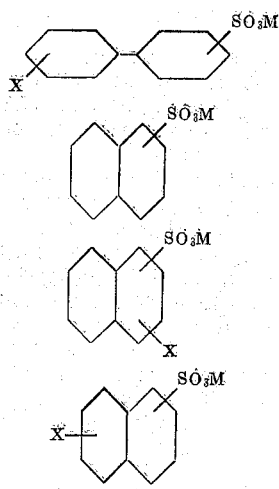

In the above compounds M represents a metal as defined and X represents a substituent group, for instance another sulfonic acid group, a hydrocarbon group (such as a methyl or other alkyl group, e. g. a long-chain group, a branched chain group, e. g. isopropyl or isobutyl, or a wax residue), hydroxyl or carboxyl, and moreover the acids may be further substituted, for instance by further groups of the type given as examples of X. Specific examples are zinc butyl naphthalene sulfonate, zinc decyl benzene sulfonate and zinc butyl diphenyl sulfonate.

If desired, the sulfonic acid or sulfonate to be employed as a vulcanization retarder can be introduced into the rubber stock in the form of a double compound with a vulcanization accelerator, especially when diphenyl guanidine is used as the accelerator, and an example of this is a double compound of diphenyl guanidine and zinc dodecyl benzene sulfonate. Such a double compound can be produced by adding an alcoholic solution of diphenyl guanidine to an alcoholic solution of its molecular equivalent of the zinc dodecyl benzene sulfonate, removing the solvent by heating to 120° C., allowing the thick syrup thereby produced to set by cooling, and grinding the resultant brittle resin to a coarse powder.

Where in this specification dodecyl benzene sulfonic acid is referred to, this is the product obtained by chlorinating a kerosene containing a substantial quantity of dodecanes, condensing the product with benzene by the Friedel-Crafts reaction, and sulfonating the condensate so formed. The zinc salt, for instance, can then be obtained by neutralizing the sulfonic acid with zinc oxide.

The invention is illustrated by the following examples relating to the treatment of natural rubber, to which the invention primarily relates. It will be appreciated, however, that it is also useful in vulcanizing synthetic rubbers of the type which can be vulcanized with sulfur.

EXAMPLE 1

Zinc dodecyl benzene sulfonate in a quantity of two parts by weight was added during the mixing of the following stock, using a very fine particle size furnace carbon black:

| | Parts by weight |
|---|---|
| Natural rubber (smoked sheets) | 100 |
| Carbon black | 45 |
| Zinc oxide | 5 |
| Stearic acid | 3 |
| Rosin-paraffin oil softener | 3 |
| Sulfur | 2.5 |
| Mercaptobenzothiazole | 0.6 |

Portions of this stock and of one identical except that it was compounded without the addition of the zinc dodecyl benzene sulfonate were tested for scorching properties in the following manner.

Pellets in the form of small cylinders 1 cc. in volume and about 1.1 cm. in height were prepared by stamping out from the sheeted stocks and trimming to the stated volume, and were heated at 120° C. for different periods of time by placing them in an aluminum holder which was immersed in a fluid medium (glycerol) maintained at the required temperature under thermostatic control. After varying periods of time samples of both stocks were removed, cooled rapidly and stored under room temperature conditions for 18 hours, and their plasticity was then tested using a parallel plate plastometer at 70° C. Each pellet was preheated for 15 minutes at 70° C. and compressed under a load of 5 kilograms for 4½ minutes, and the thickness of the compressed pellet was recorded in hundredths of a millimeter.

Two pellets from each stock were tested for each period of heating, and the average thickness (to the nearest 5 hundredths of a millimeter) was termed the "plasticity number."

The following actual data were recorded:

Table I

| Period of heating at 120° C., in minutes | Base Stock | Base Stock plus the Zinc salt |
|---|---|---|
| 0 | 300 | 265 |
| 10 | 315 | 285 |
| 20 | | 300 |
| 25 | 420 | 310 |
| 30 | 480 | 335 |
| 40 | 660 | 430 |
| 50 | | 585 |

A similar result was obtained when benzothiazyl disulfide was used as the vulcanization accelerator in place of mercaptobenzothiazole.

A similar series of experiments was carried out using benzene sulfonic acid and dodecyl benzene sulfonic acid respectively as the vulcanization retarder in place of the zinc dodecyl benzene sulfonate, but with the composition and conditions otherwise unaltered.

The values given below were obtained for the plasticity numbers. It will be appreciated that the difference between the figures obtained with the base stock and the corresponding figures in Table I is due to the fact that the two stocks were prepared on different occasions. Divergences of this kind are common in rubber technology, but the respective figures for the base stock provide proper comparison in each table.

Table II

| Period of heating at 120° C., in minutes | Base Stock | Base Stock plus benzene sulfonic acid | Base Stock plus dodecyl benzene sulfonic acid |
|---|---|---|---|
| 0 | 220 | 210 | 205 |
| 10 | 255 | 235 | 250 |
| 20 | 355 | 285 | 300 |
| 30 | 485 | 355 | 395 |
| 40 | | 435 | 495 |

The curves that can be drawn for the stocks by plotting the plasticity number against the time of heating at 120° C. can be compared directly to the base stock, the rate of rise in the plasticity number indicating the measure of scorching or precure. For convenience, as a rough guide in rapidly comparing results, the time for the plasticity number to reach a figure of 20% above the lowest on the curve may be taken as a useful indication of the "scorch time." The scorch time derived for the base stocks in this manner was 18 and 11 minutes respectively and 26 minutes for the stock containing the zinc salt. From the scorch times thus derived the stocks can be compared by computing the percentage increase in scorch time over the base stocks. The superiority of zinc dodecyl benzene sulfonate is apparent.

| Material Added to Base Stock | Percent Increase in time for Scorch |
|---|---|
| Zinc dodecyl benzene sulfonate | 44 |
| Benzene sulfonic acid | 27 |
| Dodecyl benzene sulfonic acid | none |

EXAMPLE 2

A similar series of experiments were carried out using different salts of dodecyl benzene sulfonic acid under similar conditions, except that the quantity of the retarder was one part by weight.

The following plasticity numbers were obtained:

Table III

| Period of heating at 120° C., in mins | 0 | 10 | 20 | 30 |
|---|---|---|---|---|
| Base stock | 260 | 325 | 495 | 600 |
| Base stock plus the zinc salt | 220 | 240 | 335 | 445 |
| Base stock plus the calcium salt | 255 | 275 | 435 | 580 |
| Base stock plus the magnesium salt | 230 | 265 | 370 | 505 |
| Base stock plus the copper salt | 230 | 300 | 370 | 500 |
| Base stock plus the barium salt | 235 | 260 | 410 | 565 |

Using the above data plasticity curves were plotted from which was found the time for the plasticity to rise 20% above the lowest figure. This serves as a rough guide for comparing the salts except the copper salt. While the plasticity number for the stock containing the copper salt are lower than those of the base stock, their rate of increase is not retarded until longer heating periods. The scorch times so determined were as follows:

| | Scorch time, mins. |
|---|---|
| Base stock | 8 |
| Base stock plus the zinc salt | 13 |
| Base stock plus the calcium salt | 12 |
| Base stock plus the magnesium salt | 11 |
| Base stock plus the barium salt | 11 |

EXAMPLE 3

Two similar series of experiments were carried out using the zinc salts of various aryl sulfonic acids, and the results given below were obtained. In Series A two parts by weight of the vulcanization retarder were used, and in Series B one part by weight, a separately prepared base stock being used in each series.

The following values were obtained for the plasticity numbers:

*Table IV*

| Period of heating at 120° C., in mins. | 0 | 10 | 20 | 30 | 40 |
|---|---|---|---|---|---|
| Series A: | | | | | |
| Base stock | 220 | 255 | 355 | 485 | |
| Base stock plus zinc dodecyl benzene sulfonate | 220 | 250 | 285 | 365 | 445 |
| Base stock plus zinc benzene sulfonate | 235 | 255 | 300 | 395 | 470 |
| Base stock plus zinc benzene disulfonate | 230 | 255 | 315 | 390 | 480 |
| Base stock plus zinc m-xylene sulfonate | 230 | 250 | 295 | 420 | |
| Base stock plus zinc naphthalene 2-sulfonate | 225 | 245 | 325 | 425 | |
| Base stock plus zinc p-cymene sulfonate | 215 | 245 | 295 | 380 | 455 |
| Base stock plus zinc isobutyl hydroxy diphenyl sulfonate | 225 | 265 | 310 | 435 | 580 |
| Series B: | | | | | |
| Base stock | 335 | 370 | 510 | 710 | |
| Base stock plus zinc 1-naphthol 4-sulfonate | 295 | 345 | 425 | 595 | |
| Base stock plus zinc 2-naphthol 4-sulfonate | 335 | 370 | 485 | 605 | |
| Base stock plus zinc phenol sulfonate | 350 | 350 | 440 | 625 | |

It will be noted that the zinc salts of aryl sulfonic acids functioned as efficient retarders in both series of tests. Furthermore, the data in Series A show that the zinc sulfonate substituted by a long chain alkyl group is outstanding. When the scorch times are determined by drawing plasticity curves that of the base stock is 11 minutes whereas that of the stock containing zinc dodecyl benzene sulfonate is slightly more than 13 minutes and the slope of the curve does not change appreciably before 20 minutes' heating. After 13 minutes the plasticity numbers of the stocks containing the other zinc salts are all somewhat higher.

The method of preparing zinc dodecyl benzene sulfonate has already been referred to in this specification. The acids from which the other zinc salts were prepared were those formed by direct sulfonation of the organic compound in question, e. g. m-xylene in the case of m-xylene sulfonic acid and benzene sulfonic acid in the base of benzene disulfonic acid.

EXAMPLE 4

While the new retarders are especially useful in furnace black stocks their retarding activity is by no means dependent upon the presence of furnace black as illustrated by this and the following three examples. Zinc dodecyl benzene sulfonate in a quantity of 0.5 part by weight was added during the mixing of the following stock:

| | Parts by weight |
|---|---|
| Natural rubber (pale crepe) | 100 |
| Precipitated whiting | 30 |
| Zinc oxide | 5 |
| Stearic acid | 1 |
| Sulfur | 2.5 |
| Mercaptobenzothiazole | 0.6 |

Portions of this stock and of one identical except that it was compounded without the addition of the zinc dodecyl benzene sulfonate were tested for scorching properties in the manner described in Example 1, except that the pellets were heated to 100° C., and the following data were obtained:

*Table V*

| Period of heating at 100° C., in minutes | Base Stock | Base stock plus the zinc salt |
|---|---|---|
| 0 | 200 | 205 |
| 60 | 200 | 175 |
| 100 | 400 | 190 |
| 120 | 620 | 220 |

EXAMPLE 5

A series of experiments similar to those described in Example 4 were carried out except that instead of mercaptobenzothiazole there was used as vulcanization accelerator 0.5 part by weight of a condensation product of butyraldehyde and aniline.

The following values were obtained for the plasticity numbers:

*Table VI*

| Period of heating at 100° C., in minutes | Base Stock | Base stock plus the zinc salt |
|---|---|---|
| 0 | 170 | 165 |
| 40 | 180 | 175 |
| 60 | 190 | 180 |
| 90 | 280 | 210 |
| 150 | 445 | 285 |

EXAMPLE 6

A series of experiments similar to those described in Example 4 were carried out except that instead of mercaptobenzothiazole there was used of tetramethyl thiuram disulfide, and the quanas vulcanization accelerator 0.375 part by weight tity of sulfur was reduced to 2.0 parts by weight.

The following results were obtained:

*Table VII*

| Period of heating at 100° C., in minutes | Base Stock | Base stock plus the zinc salt |
|---|---|---|
| 0 | 175 | 165 |
| 10 | 170 | 160 |
| 30 | 210 | 190 |
| 40 | 305 | 265 |
| 50 | 415 | 345 |

EXAMPLE 7

A series of experiments similar to those described in Example 6 were carried out except that instead of the tetramethyl thiuram disulfide there was used as vulcanization accelerator an equal amount of zinc diethyl dithiocarbamate.

The following values were obtained for the plasticity numbers:

*Table VIII*

| Period of heating at 100° C., in minutes | Base Stock | Base stock plus the zinc salt |
|---|---|---|
| 0 | 175 | 165 |
| 10 | 270 | 240 |
| 20 | 465 | 340 |
| 30 | 725 | 430 |
| 40 | | 625 |

EXAMPLE 8

A base stock of the following composition was prepared using a very fine particle size furnace carbon black:

| | Parts by weight |
|---|---|
| Natural rubber (smoked sheets) | 100 |
| Carbon black | 45 |
| Zinc oxide | 5 |
| Stearic acid | 3 |
| Rosin-paraffin oil softener | 3 |
| Sulfur | 2.5 |
| Benzothiazyl disulfide | 0.45 |

To this base stock there was added 0.404 part of a double compound prepared from equimolecular proportions of diphenyl guanidine and zinc dodecyl benzene sulfonate as described earlier in this sepcification.

The stock was tested for scorching properties in the manner described in Example 1, with the following results:

Table IX

| Period of heating at 120° C., in mins. | Plasticity number |
|---|---|
| 0 | 235 |
| 10 | 260 |
| 20 | 350 |
| 30 | 435 |
| 40 | 605 |

EXAMPLE 9

A base stock of the following composition was prepared using a very fine particle size furnace carbon black:

| | Parts by weight |
|---|---|
| Natural rubber (smoked sheets) | 100 |
| Carbon black | 50 |
| Zinc oxide | 5 |
| Saturated hydrocarbon softener | 3 |
| Stearic acid | 2.5 |
| Sulfur | 2 |
| Condensation product of p-amino diphenyl and acetone | 1.5 |
| N-cyclohexyl-2-benzothiazole sulfenamide | 0.8 |

To this base stock was added zinc dodecyl benzene sulfonate in the amounts indicated below and the resistance to "scorch" determined by means of a Mooney plastometer. This instrument is described by Melvin Mooney in Industrial and Engineering Chemistry, Analytical Edition, March 15, 1934, pages 147–151. The following actual data were recorded employing the large rotor at 121° C.

Table X

| Zinc salt added to Base Stock, Parts by weight | Mooney Plasticity after Heating at 121° C. for— | | | | |
|---|---|---|---|---|---|
| | 19 mins. | 20 mins. | 21 mins. | 22 mins. | 23 mins. |
| none | 105 | 106 | 110 | 131 | 172 |
| 0.2 | 101 | 101 | 102 | 121 | 165 |
| 0.3 | 102 | 102 | 102 | 104 | 108 |

The retarding action of the zinc salts is even more strikingly illustrated by Mooney plasticity readings at 135° C. At this temperature the slope of the plasticity curve for the base stock increased abruptly after 6 minutes' heating whereas those of the stocks containing the zinc salt did not rise appreciably until after 9 minutes' heating. The actual data are recorded below:

Table XI

| Zinc salt added to Base Stock, Parts by weight | Mooney Plasticity after Heating at 135° C. for— | | | | | | |
|---|---|---|---|---|---|---|---|
| | 4 mins. | 5 mins. | 6 mins. | 7 mins. | 8 mins. | 9 mins. | 10 mins. |
| none | 70 | 71 | 74 | 76 | 140 | 200 | |
| 0.2 | 61 | 61 | 60 | 60 | 59 | 65 | 90 |
| 0.3 | 60 | 60 | 60 | 58 | 58 | 62 | 68 |

In addition the above described base and the stocks prepared by adding to it the zinc salt of dodecyl benzene sulfonic acid were cured in the usual manner by heating in a press for different periods of time at 126° C. The modulus and tensile properties are all comparable at full cure showing that no adverse affect on physical properties results from the presence of the zinc salt. However, the lower modulus of the initial cures as compared to the base is further illustrative of the increased processing safety afforded by incorporating a zinc sulfonate into a base stock which contains a delayed action accelerator.

Table XII

| Zinc salt added to Base Stock, Parts by weight | Cure Time, in mins. | Modulus of Elasticity in lbs./in.² at 300% Elongation | Tensile at Break, in lbs./in.² | Ultimate Elongation, Percent |
|---|---|---|---|---|
| none | 15 | 2,600 | 3,750 | 480 |
| 0.2 | 15 | 2,580 | 3,590 | 457 |
| 0.3 | 15 | 1,863 | 3,373 | 523 |
| none | 45 | 2,783 | 3,543 | 403 |
| 0.2 | 45 | 2,790 | 3,743 | 450 |
| 0.3 | 45 | 2,720 | 3,763 | 463 |

EXAMPLE 10

A series of experiments was carried out employing the base stock of Example 1. The retarder was added to the base stock and resistance to scorch determined by means of a Mooney plastometer. The scorch point was taken as the time at which the plasticity curve begins to rise continuously. As illustrated by the data in Example 9 the readings remain fairly constant and then begin to rise rapidly, the rise showing that the stocks are beginning to cure. Two series of experiments were carried out at 135° C. the data for which are contained in the following table. It will be noted that in each series the zinc salts are more efficient retarders than the free acids. However, the sodium and cadmium salts are either inactive or activate instead of retard cure.

Table XIII

| Material Added to Base Stock | Amount | Scorch time, mins. at 135° C. |
|---|---|---|
| Series A: | | |
| None | | 3 |
| Dodecyl benzene sulfonic acid | 0.5 | 4 |
| Zinc dodecyl benzene sulfonate | 0.5 | 5 |
| Sodium dodecyl benzene sulfonate | 1.0 | 3 |
| Series B: | | |
| None | | 4 |
| Benzene sulfonic acid | 2.0 | 4 |
| Zinc benzene sulfonate | 2.0 | 5 |
| Toluene sulfonic acid | 2.0 | 4 |
| Zinc toluene sulfonate | 2.0 | 5 |
| Cadmium dodecyl benzene sulfonate | 2.0 | 3 |

Another series of experiments was carried out at 121° C. again employing the Mooney plastometer to determine the scorch time as described. At 135° C. retarding effect of the free sulfonic acid was not demonstrated by this test except in the case of an acid substituted by a long chain alkyl group. However, at 121° C. retarding activity of benzene sulfonic acid was demonstrated although again the superiority of the zinc salts was apparent. The data are set forth below:

Table XIV

| Material Added to Base Stock | Amount | Scorch time, mins. at 121° C. |
|---|---|---|
| None | | 6 |
| Benzene sulfonic acid | 1.0 | 7 |
| Zinc benzene sulfonate | 1.0 | 8 |
| Zinc toluene sulfonate | 1.0 | 8 |

Additionally, the base stock and stocks containing 2.0 parts of a sulfonate as indicated were cured in the usual manner by heating in a press at 142° C. The modulus and tensile properties of the cured products are shown below:

Table XV

| Material Added to Base Stock | Cure Time, in mins. | Modulus of Elasticity in lbs./in.$^2$ at 300% Elongation | Tensile at Break, in lbs./in.$^2$ | Ultimate Elongation, percent |
|---|---|---|---|---|
| None | 15 | 1,335 | 3,465 | 580 |
| Zinc benzene sulfonate | 15 | 1,166 | 3,123 | 590 |
| Zinc toluene sulfonate | 15 | 1,080 | 2,990 | 600 |
| Zinc dodecyl benzene sulfonate | 15 | 1,080 | 3,026 | 953 |
| Sodium dodecyl benzene sulfonate | 15 | 1,465 | 3,715 | 590 |
| None | 45 | 1,950 | 3,805 | 500 |
| Zinc benzene sulfonate | 45 | 1,895 | 3,910 | 535 |
| Zinc toluene sulfonate | 45 | 1,915 | 3,780 | 500 |
| Sodium dodecyl benzene sulfonate | 45 | 1,890 | 3,556 | 500 |
| Zinc dodecyl benzene sulfonate | 60 | 2,033 | 3,876 | 510 |

The initial cures show that the zinc salts all retard noticeably whereas the sodium salt shows activation if anything. However, it will be noted that at full cure the stocks containing the zinc salts give normal modulus and tensile properties. Furthermore these cure data are in agreement with the plasticity data of Table IV in showing that the presence of a long chain alkyl group in the zinc sulfonate nucleus provides stronger retardation in that a longer heating period is required to match the modulus and tensile properties of the base stock.

The superiority of the sulfonate salts to the free sulfonic acids is surprising when it is considered that conversion of carboxylic acid retarders to salts usually lessens or entirely destroys the retarding activity. Furthermore the effect of sulfonates in furnace black stocks is to be contrasted to that of carboxylic acids and anhydrides. Typical carboxylic acids and anhydrides having a retarding effect in channel black stocks were evaluated and found to be ineffective in the presence of furnace black. For example, 0.4 part by weight of a carboxylic acid was added to a base stock identical to that employed in Example 9 except that it contained 2 parts instead of 2.5 parts stearic acid and 2.5 parts instead of 2.0 parts of sulfur. Scorch was determined by means of a Mooney plastometer at 135° C. When evaluated in this manner stocks containing ortho-benzyl benzoic acid, maleic anhydride, monochloroacetic acid and naphthoylbenzoic acid showed no retardation whatsoever.

It will be understood that salts of other sulfonic acids than those contained in the examples to illustrate the invention may be used. As other examples there may be mentioned zinc salts of petroleum sulfonic acids and zinc cyclohexylsulfonate.

This application is a continuation-in-part of copending application Serial No. 97,078, filed June 3, 1949.

What is claimed is:

1. A process of vulcanizing a sulfur vulcanizable conjugated diene polymer rubber with sulfur and an organic accelerator in which there is employed as vulcanization retarder a small amount of a member of the group consisting of zinc, calcium, magnesium, copper and barium salts of an aryl sulfonic acid.

2. A process of vulcanizing natural rubber containing a furnace carbon black with sulfur and an organic accelerator in which there is employed as vulcanization retarder a small amount of a member of the group consisting of zinc, calcium, magnesium, copper and barium salts of an aryl sulfonic acid.

3. A process of vulcanizing a sulfur vulcanizable conjugated diene polymer rubber with sulfur and an organic accelerator in which there is employed as vulcanization retarder a zinc salt of an aryl sulfonic acid.

4. A process of vulcanizing natural rubber containing a furnace carbon black with sulfur and an organic accelerator in which there is employed as vulcanization retarder a small amount of a zinc salt of an aryl sulfonic acid substituted by an alkyl group containing at least 6 but not more than 12 carbon atoms.

5. A process of vulcanizing a sulfur vulcanizable conjugated diene polymer rubber containing a furnace carbon black with sulfur and an organic accelerator in which there is employed as vulcanization retarder a small amount of the zinc salt of dodecyl benzene sulfonic acid.

6. A process of vulcanizing a sulfur vulcanizable conjugated diene polymer rubber containing a furnace carbon black with sulfur and an organic accelerator in which there is employed as vulcanization retarder a small amount of the double compound of diphenyl guanidine and zinc dodecyl benzene sulfonate.

7. A process of vulcanizing a sulfur vulcanizable conjugated diene polymer rubber with sulfur and an organic accelerator in which there is employed as vulcanization retarder a small amount of a zinc salt of benzene sulfonic acid substituted by an alkyl group containing at least 6 but not more than 12 carbon atoms.

8. Rubber which has been vulcanized by the process of claim 1.

9. Rubber which has been vulcanized by the process of claim 2.

10. Rubber which has been vulcanized by the process of claim 3.

11. Rubber which has been vulcanized by the process of claim 4.

12. Rubber which has been vulcanized by the process of claim 5.

13. Rubber which has been vulcanized by the process of claim 6.

14. Rubber which has been vulcanized by the process of claim 7.

WILLIAM McGILLIVRAY MORGAN.

References Cited in the file of this patent

UNITED STATES PATENTS

| Number | Name | Date |
|---|---|---|
| 1,871,037 | Cadwell | Aug. 9, 1932 |
| 2,419,512 | Vesce | Aug. 22, 1947 |
| 2,567,853 | Morgan | Sept. 11, 1951 |